(12) United States Patent
Chun et al.

(10) Patent No.: US 7,979,769 B2
(45) Date of Patent: Jul. 12, 2011

(54) METHOD AND APPARATUS FOR PERFORMING RANDOM ACCESS PROCEDURES

(75) Inventors: Sung-Duck Chun, Gyeonggi-do (KR); Seung-June Yi, Gyeonggi-do (KR); Sung-Jun Park, Gyeonggi-do (KR); Young-Dae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 232 days.

(21) Appl. No.: 12/423,688

(22) Filed: Apr. 14, 2009

(65) Prior Publication Data

US 2009/0259910 A1 Oct. 15, 2009

Related U.S. Application Data

(60) Provisional application No. 61/044,558, filed on Apr. 14, 2008, provisional application No. 61/047,736, filed on Apr. 24, 2008.

(30) Foreign Application Priority Data

Apr. 13, 2009 (KR) .................... 10-2009-0031965

(51) Int. Cl.
*H04L 1/18* (2006.01)
*G08C 25/02* (2006.01)
(52) U.S. Cl. ................. 714/748; 714/750; 714/E11.141; 370/474
(58) Field of Classification Search ........... 714/E11.141, 714/748–751; 370/474
See application file for complete search history.

(56) References Cited

U.S. PATENT DOCUMENTS

| 2003/0223452 A1* | 12/2003 | Toskala et al. ................ 370/442 |
| 2007/0047451 A1* | 3/2007 | Lohr et al. .................... 370/242 |
| 2011/0044195 A1* | 2/2011 | Wiemann et al. ............. 370/252 |

FOREIGN PATENT DOCUMENTS

| KR | 1020010110188 | 12/2001 |
| KR | 1020060052994 | 5/2006 |
| KR | 1020080016367 | 2/2008 |
| KR | 1020080024419 | 3/2008 |

OTHER PUBLICATIONS

3rd Generation Partnership Project (3GPP); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)"; Doc. No. 3GPP TS 36.300 V8.4.0; Mar. 2008.

3rd Generation Partnership Project (3GPP); "3rd Generation Partnership Project; Technical Specification Group Radio Access Network; Evolved Universal Terrestrial Radio Access (E-UTRA) Medium Access Control (MAC) Protocol Specification (Release 8)"; Doc. No. 3GPP TS 36.321 V8.1.0; Mar. 2008.

* cited by examiner

*Primary Examiner* — Guy J Lamarre
(74) *Attorney, Agent, or Firm* — Lee, Hong, Degerman, Kang & Waimey

(57) ABSTRACT

A mobile terminal and a method of performing a random access procedure by the terminal is achieved by transmitting a random access preamble to a base station, receiving a random access response from the base station, and performing an uplink transmission using an uplink grant from the base station. The uplink transmission is performed by using a maximum number of HARQ (Hybrid Automatic Repeat reQuest) transmissions parameter, which is included in a System Information Block (SIB) received from the base station.

15 Claims, 9 Drawing Sheets

METHOD AND APPARATUS FOR PERFORMING RANDOM ACCESS PROCEDURES

CROSS-REFERENCE

The present application claims priority benefit to the following applications, which contents are all incorporated by reference herein: U.S. Provisional Application Nos. 61/044,558 (filed Apr. 14, 2008) and 61/047,736 (filed Apr. 24, 2008), and Korean Patent Application No. 10-2009-0031965 (filed Apr. 13, 2009).

BACKGROUND

The present invention relates to a method for performing random access procedures. In the related art, random access procedures were performed, but radio resources were unnecessarily wasted. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that a method of performing random access procedures is provided, which results in more efficient use of radio resources.

DETAILED DESCRIPTION

The inventive concepts and features herein related to a method for performing random access procedures are explained in terms of a Long Term evolution (LTE) system or other so-called 4 G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

Second generation (2G) mobile communications relate to transmitting and receiving voice signals in a digital manner, and include technologies such as CDMA, GSM, and the like. As an enhancement from GSM, GPRS was developed to provide packet switched data services based upon GSM.

Third generation (3G) mobile communications relate to transmitting and receiving not only voice signals, but also video and data. The 3GPP (Third Generation Partnership Project) developed the IMT-2000 mobile communication system and selected WCDMA as its radio access technology (RAT). The combination of IMT-2000 and WCDMA can be referred to as UMTS (Universal Mobile Telecommunications System), which comprises a UMTS Terrestrial Radio Access Network (UTRAN).

As data traffic is expected to increase dramatically, the standardization for $3^{rd}$ generation mobile communications is underway to establish a Long-Term Evolution (LTE) network that supports greater bandwidth. LTE technologies are employed for an Evolved-UMTS (E-UMTS), which has an Evolved-UTRAN (E-UTRAN) that uses OFDMA (Orthogonal Frequency Division Multiple Access) as its radio access technology (RAT).

Figure 1:
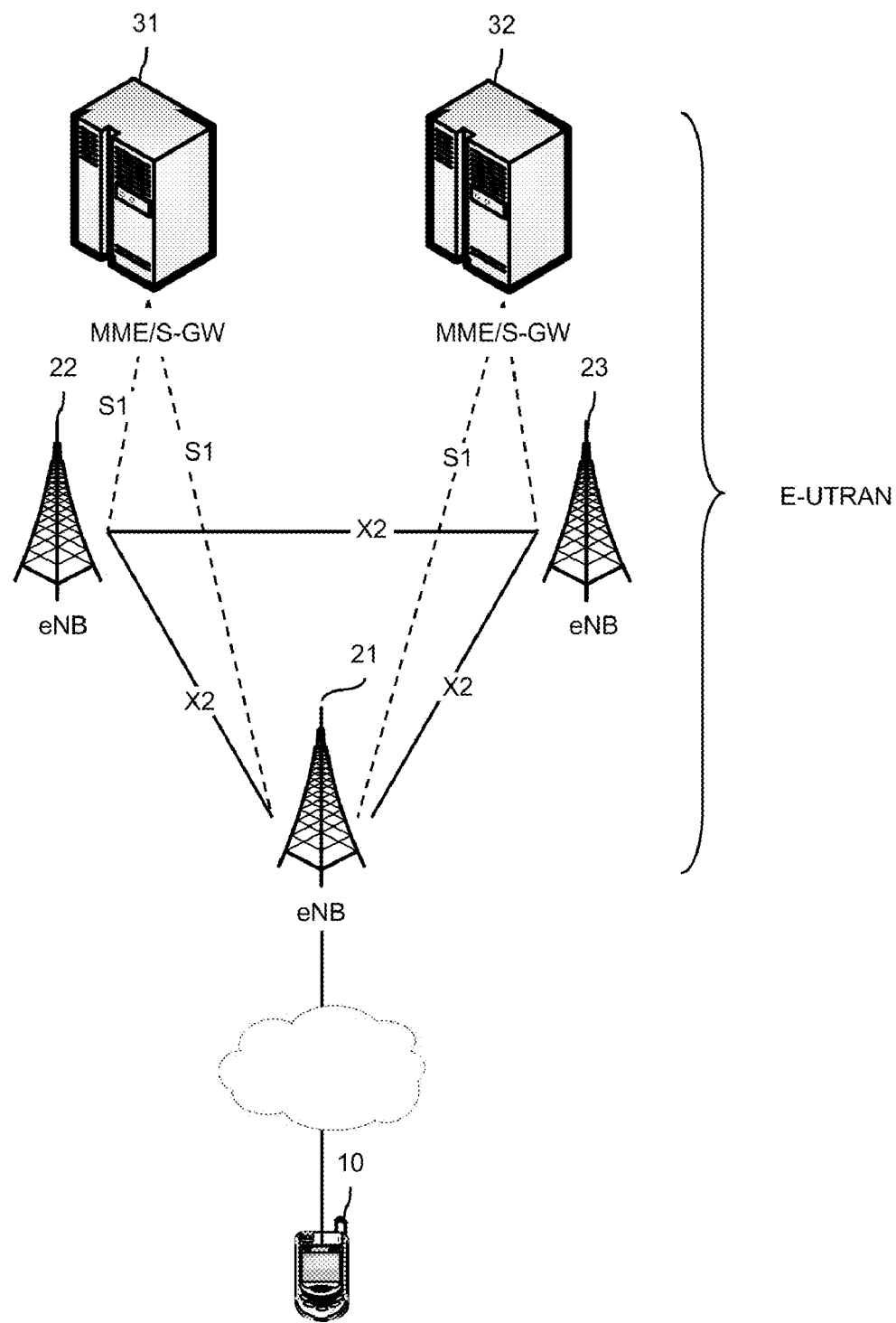
FIG. 1 shows an exemplary network architecture of an Evolved Universal Mobile Telecommunications System (E-UMTS).

FIG. 1 shows the network architecture of an Evolved Universal Mobile Telecommunications System (E-UMTS).

As can be understood from FIG. 1, the E-UMTS is a system that has evolved from UMTS and its basic standardization is currently being performed by the 3GPP organization. The E-UMTS system is also referred to as an LTE (Long-Term Evolution) system.

The E-UMTS network can be basically divided into the E-UTRAN and the CN (core network). The E-UTRAN includes a mobile terminal (User Equipment: UE) 10, a base station (eNode B: eNB) 21, 22, 23 (all referred to as 20), a serving gateway (S-GW) 31 located at the end of the network and connected to external networks, and a Mobility Management Entity (MME) 32 that oversees the mobility of the mobile terminals. For a single eNode B 20, one or more cells may exist.

Figure 2:
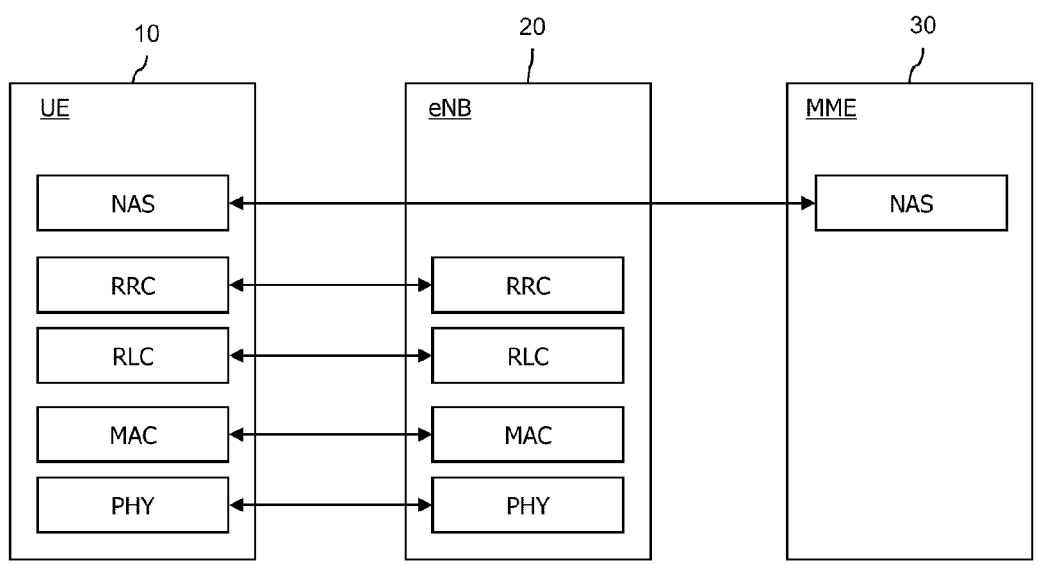
FIG. 2 shows an exemplary control plane radio interface protocol stack used between a UE and an eNB.
Figure 3:
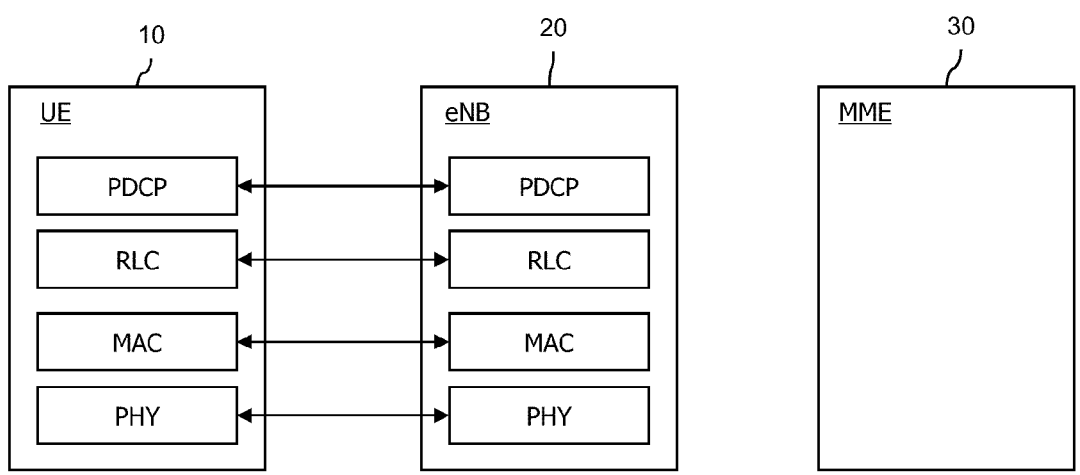
FIG. 3 shows an exemplary user plane radio interface protocol stack used between a UE and an eNB.

FIG. 2 shows an exemplary control plane radio interface protocol stack used between a UE and an eNB, and FIG. 3 shows an exemplary user plane radio interface protocol stack used between a UE and an eNB.

Such radio interface protocol is based upon the 3GPP radio access network standard, and is horizontally divided into a physical layer, a data link layer and a network layer, while vertically divided into a user plane for transmitting data information and a control plane for transferring control signaling.

The protocol layers are based on the lower 3 layers of the Open System Interconnection (OSI) standard model, and are divided into a first layer (L1), a second layer (L2), and a third layer (L3).

Hereafter, each layers in the control plane radio protocol of FIG. 2 and in the user plane radio protocol of FIG. 3 will be explained.

L1 (Layer 1) is a physical layer (PHY) that uses physical channels to provide an information transfer service to upper layers. The PHY layer is connected to an upper layer (the MAC layer) via transport channels through which data is transferred between the MAC layer and the PHY layer. Also, between respectively different physical layers (i.e. between physical layers in the transmitting side and in the receiving side), data is transferred through the physical channels.

The physical channels that exist for the physical layer in the transmitting side and in the receiving side include: SCH (Synchronization Channel), PCCPCH (Primary Common Control Physical Channel), SCCPCH (Secondary Common Control Physical Channel), DPCH (Dedicated Physical Channel), PICH (Paging Indicator Channel), PRACH (Physical Random Access Channel), PDCCH (Physical Downlink Control Channel) and PDSCH (Physical Downlink Shared Channel) and the like.

The MAC (Media Access Control) layer provides services to an upper layer, namely the RLC (Radio Link Control) layer via logical channels. Here, based upon the type of data being transmitted, the logical channels can be divided into control channels that are used to transmit control plane data, and traffic channels that are used to transmit user plane data.

In L2 (Layer 2), the RLC (Radio Link Control) layer is responsible for supporting the transmission of data with reliability. Each radio bearer (RB) is responsible to the guarantee of QoS (Quality of Service) and transmits data accordingly. In order to guarantee the QoS that is unique to the RB, one or two independent RLC entities are provided for each RB, and three types of RLC modes (TM: Transparent Mode, UM: Unacknowledged Mode, and AM: Acknowledged Mode) are provided to support various QoS.

In L2 (Layer 2), the PDCP layer performs a header compression function to allow effective transmission of IP packets (such as IPv4 and IPv6) over the radio interface having relatively small bandwidth, by reducing the size of IP packet headers that contain relatively large and unnecessary control information. Also, the PDCP layer is used to perform encoding of control plane (C-plane) data, such as RRC messages. The PDCP layer can also perform encoding of user plane (U-plane) data as well.

Located at the topmost region of L3 (Layer 3), the RRC (Radio Resource Control) layer is defined only in the control plane, and handles the configuration, re-configuration and release of radio bearers (RBs) and handles the control of logical channels, transport channels, and physical channels associated thereto.

Here, the RB refers to a service provided by Layer 2 to transfer data between the UE and the E-UTRAN.

Among the transport channels, there is a RACH (Random Access Channel) which is used to transmit data having relatively short length via the uplink. In particular, the RACH is used when a terminal, which has not been allocated any dedicated radio resources, has a signaling message or user data that needs to be transmitted via the uplink, or is used when the base station (eNB) indicates to the terminal that a ransom access procedure is to be performed.

Hereafter, the random access procedure provided in an LTE system will be explained in more detail.

The terminal performs a random access procedure in the following exemplary situations:
  when the terminal performs an initial connection with the base station if there is no connection (RRC connection);
  when the terminal first accesses the target cell in the handover procedure;
  when requested by a command from the base station;
  if time synchronization of the uplink does not match, or the designated radio resources to be used for requesting radio resources have not been allocated, but when data of the uplink is generated; and
  recovery procedure when there is a radio link failure or handover failure.

In the LTE system, such random access procedures can be divided into a contention based random access procedure and a non-contention based random access procedure. Such division depends upon whether the random access preamble used during the random access procedure is selected by the terminal itself or selected by the base station.

In the non-contention based random access procedure, the terminal uses the random access preamble that was directly allocated to it by the base station. Thus, when the base station allocates a particular random access preamble to the terminal, only that terminal uses such random access preamble, and other terminals do not use this random access preamble. Thus, because the random access preamble and the terminal using that random access preamble have a 1:1 relationship, it can be said that there are no collisions (or contentions). In such case, as soon as such random access preamble is received by the base station, the terminal that transmitted the random access preamble can be known, and such procedures are efficient.

In contrast, in the contention based random access procedure, among a plurality of random access preambles that the terminal can use, one is randomly chosen and transmitted, and thus there is the possibility that a plurality of terminals may use the same random access preamble. Thus, upon receiving a particular random access preamble, the base station cannot know which terminal transmitted such random access preamble.

Figure 4:
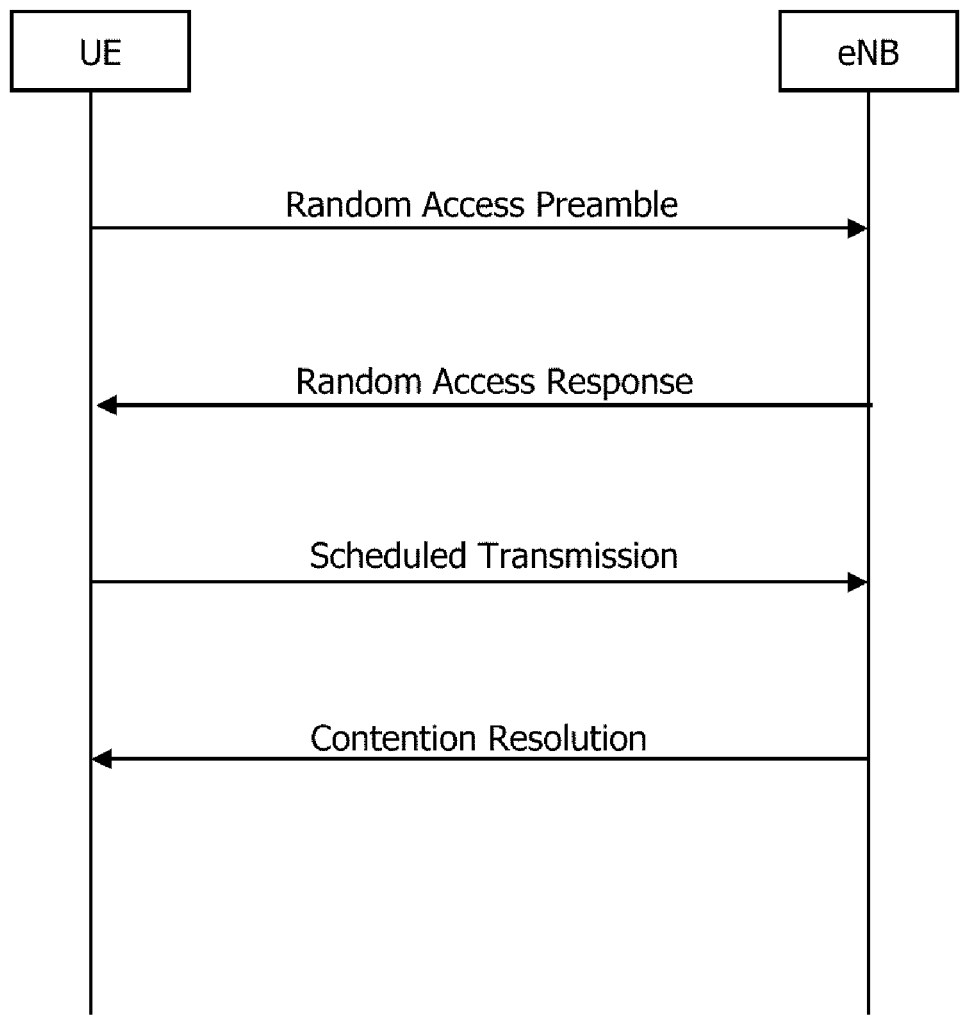
FIG. 4 shows an exemplary flow chart of a contention based random access procedure between a UE and eNB.

FIG. 4, which shows a flow chart of the contention based random access procedure between the terminal and the base station, will be referred to in order to explain about the contention based random access procedure.

1) First, in the contention based random access procedure, based upon the indication of a group of random access preambles provided through system information or a handover command, the terminal randomly selects one random access preamble, then selects the PRACH resources that can be used to transmit such random access preamble, and performs transmission.

Here, the preamble may be referred to as RACH MSG 1. If the terminal itself selects the preamble at random, such is called a contention based RACH procedure, and such selected preamble is called a contention based preamble. Meanwhile, if the terminal is allocated a preamble from the network via the RRC or the PDCCH, this is called a non-contention based RACH procedure, and the preamble is called a dedicated preamble.

2) After transmitting the random access preamble in the above manner, the terminal attempts to receive its random access response within a random access response reception window that was indicated by system information or handover command from the base station.

In more detail, random access response information (i.e. RACH MSG 2) is transmitted as a MAC PDU (Protocol Data Unit) format, and such MAC PDU is transferred via a PDSCH (Physical Downlink Shared Channel). Namely, in order to allow the terminal to appropriately receive the information transferred over the PDCCH, control information is also transferred to the terminal through the PDCCH (Physical Downlink Control Channel). Namely, the PDCCH information includes information about the terminal that needs to receive the PDSCH, the frequency and time information for the radio resources of the PDSCH, and the transmission formation of the PDSCH, and the like.

If the terminal succeeds in receiving the PDCCH, then the random access response sent via the PDSCH can be appropriately received according to the information of the PDCCH. Here, the random access response includes values such as a preamble identifier (ID), a UL Grant (uplink radio resources), a temporary C-RNTI (Radio Network Temporary Identifier), and a time alignment command, and the like. Here, if a random access preamble identifier is needed, and because ransom access response information intended for one or more terminals can be included in a single random access response, the UL grant, temporary C-RNTI, and Time Alignment Command information are used to inform about the terminal for which such information is valid. The random access preamble identifier is the same as the random access preamble that was selected in the procedures mentioned above. In the procedure 1) above, if the dedicated preamble was used, and if MSG 2 included a corresponding response, the ransom access procedure is ended.

3) If the terminal receives a random access response that is valid for itself, the information included in the random access response is processed respectively.

Namely, the terminal applies the Time Alignment Command, and stored the temporary C-RNTI. Also, by using the UL Grant, the data stored in the buffer of the terminal or newly generated data are transmitted to the base station. Here, the data transmitted through the UL Grant, namely the MAC PDU is commonly referred to as a RACH MSG 3.

Among the data included in the UL Grant (also referred to as message 3), the identifier of the terminal should essentially be included. This is because the base station cannot determine which terminals performed the random access procedure, identifying each terminal allows future collisions to be resolved.

Here, there are two ways to include a terminal identifier. First, If the terminal has a valid cell identifier that was allocated from the corresponding cell before the random access procedure, the terminal transmits its cell identifier through the UL Grant. However, if a valid cell identifier was not allocated, the terminal performs transmission by included its own unique identifier (e.g. S-TMSI or Random ID). In general, such unique identifier is greater in length than the cell identifier. If the terminal transmitted data through the UL Grant, a contention resolution timer is started.

4) After transmitting data that includes its identifier, through use of the UL Grant included in the random access response, the terminal waits for instructions from the base station for contention resolution (or to resolve any contention). Namely, an attempt to receive the PDCCH is made in order to receive a certain message.

There are two types of ways to receive the PDCCH. As described previously, the first way is to attempt PDCCH reception by using the cell identifier, if the cell identifier is its identifier that was transmitted via the UL Grant. The second way (i.e. if its identifier is a unique identifier) is to use the Temporary C-RNTI included in the random access response in attempting to receive the PDCCH.

In the above first method, if the PDCCH (hereafter referred to as message 4) is received through its cell identifier before expiration of the contention resolution timer, the terminal determines that the random access procedure was performed in a normal manner, and the random access procedure is ended. In the above second method, if the PDCCH was received through the temporary cell identifier before expiration of the contention resolution timer, the data within the PDSCH is checked according to the indication of the PDCCH. The data (or MACH PDU) within the PDSCH is often referred to as PACH MSG 4. If the above data includes its unique identifier, the terminal determines that the random access procedure was performed normally, and the random access procedure is ended.

Next, the method of receiving data (i.e. downlink data) by the terminal from the base station via a physical channel will be explained.

Figure 5:
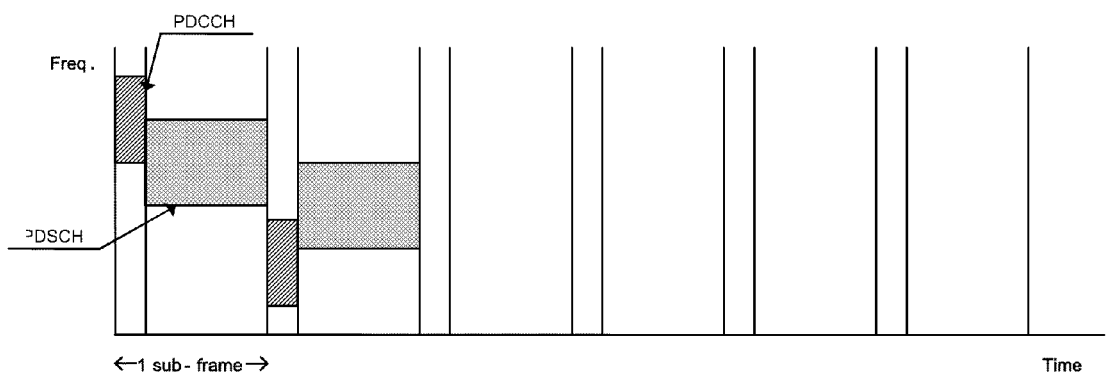
FIG. 5 shows an exemplary relationship between the PDCCH and PDSCH, which are channels from the eNB to the UE.

FIG. 5 shows the relationship between the PDCCH (Physical Downlink Control Channel) and the PDSCH (Physical Downlink Shared Channel), which are channels from the base station to the terminal.

As shown in FIG. 5, in the downlink from the base station to the terminal, there are basically two types of physical channels, PDCCH and PDSCH.

The PDCCH is not directly related to user data transmissions, but is used to send control information needed for managing physical channels. To put simply, it can be said that the PDCCH is used for controlling other physical channels. In particular, the PDCCH is used to transmit information needed by the terminal to receive the PDSCH. Information about the data having been transmitted at a particular point in time, using a certain frequency bandwidth, intended for certain terminals, the size of such data and the like are transmitted via the PDCCH. Thus, each terminal receives the PDCCH at a particular TTI (Transmit Time Interval), and through the PDCCH, it is checked as to whether or not the data to be received was transmitted, and if transmission of the data that needs to be received is informed, the information such as the frequency indicated by the PDCCH is used in receiving the PDSCH. Namely, it can be said that information specifying about which terminal (one or a plurality) should receive PDSCH data, how such terminal(s) should receive and decode the PDSCH data, and the like are included in the PDCCH (Physical Downlink Control Channel).

For example, in a particular sub-frame, it is assumed that radio resources information A (e.g. frequency position) and transmission format information B (e.g. transport block size, modulation method, coding information, etc.) undergo CRC masking using information C (i.e. RNTI (Radio Network Temporary Identity)) and transmitted via the PDCCH. Here, one or more terminals in the corresponding cell use their RNTI information to monitor the PDCCH. As such, for a terminal having an RNTI of C, when the PDCCH is decoded, CRC errors do not occur. Thus, such terminal employs the transport format information B and the radio resource information A to decode the PDSCH and receive data. Meanwhile, for any terminal that does not have an RNTI of C, CRC errors occur when the PDCCH is decoded. Thus, such terminal does not receive the PDSCH.

In the above procedures, in order to inform about how radio resources were allocated to which terminals, an RNTI (Radio Network Temporary Identifier) is transmitted and there are two types of RNTIs: dedicated RNTIs and common RNTIs. A dedicated RNTI is allocated to a single terminal, and is used for transmission and reception of data corresponding to that terminal. The dedicated RNTI is allocated only to a terminal that had its information registered in the base station. In contrast, a common RNTI is used by terminals that did not receive allocation of a dedicated RNTI because its information was not registered in the base station, but need to send and receive data with the base station, or a common RNTI is used in transmitting information (such as system information) that commonly applies to a plurality of terminals.

As described thus far, the E-UTRAN is comprised of two main elements: a base station and a terminal.

The radio resources for a single cell are comprised of uplink radio resources and downlink radio resources. The base station handles the allocation and control of uplink radio resources and downlink radio resources. Namely, the base station determines when and what radio resources are to be used by particular terminals. For example, the base station can determine that 3.2 seconds from now, frequencies 100 MHz to 101 MHz are to be allocated to user 1 to be used for a duration of 0.2 seconds in downlink data transmissions.

After the base station makes such determination, this is informed o the terminal to allow downlink data reception thereof. Similarly, the base station also determines when and how much of a certain radio resource should be used by a particular terminal(s) for uplink data transmissions, then informs the terminal(s) abut this determination such that these terminal(s) can use the determined radio resources for data transmissions.

Unlike in the related art, by having the base station dynamically manage radio resources, the effective use of radio resources is possible. In the related art, a single radio resource was continuously used by a single terminal during a call connection. This is especially unreasonable considering that many recent services are IP packet based. This is because packet services do not generate packets in a continuous manner during the duration of the call connection, and thus there are many time periods where nothing is being transmitted. Despite this, continuously allocated radio resources for that single terminal is not efficient. To solve this issue, in the E-UTRAN system, radio resources are allocated to the terminal only when necessary and when service data exists.

Figure 6:
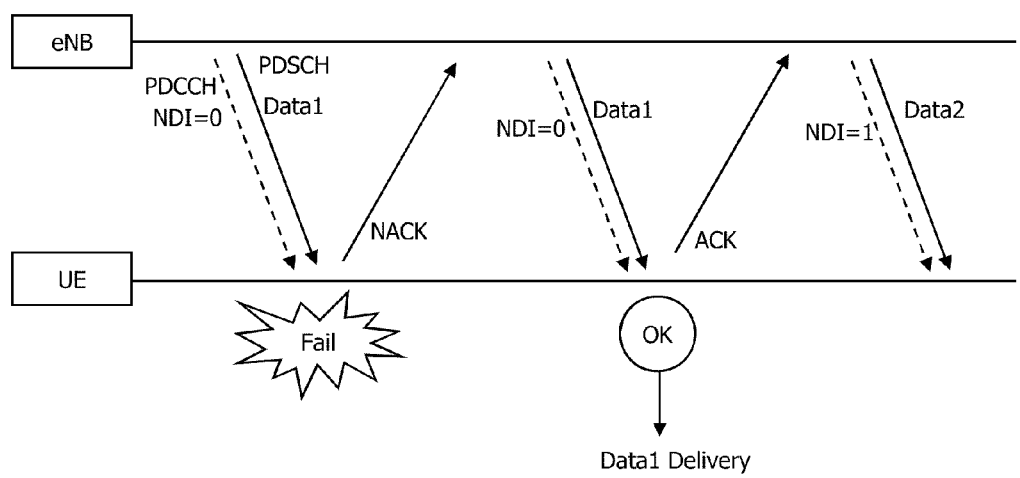
FIG. 6 shows some exemplary HARQ operations between the eNB and UE.

FIG. 6 shows some exemplary HARQ operations that may be performed in the MAC layer, and the HARQ operation details are as follows:

First, in order for the base station to transmit data to the terminal in a HARQ method, scheduling information is transmitted through a PDCCH (Physical Downlink Control Channel).

Such scheduling information may include terminal identifiers or terminal group identifiers (i.e. UE ID or Group ID), position of allocated radio resources (i.e. resource assignment), transmission parameters (i.e. modulation methods, payload size, MIMO related information, etc.), HARQ process information, redundancy version, and new data indicators, and the like.

The scheduling information is transferred through the PDCCH with respect to retransmissions, and the corresponding information may change according to the channel environment. For example, if the channel environment has become better than that of initial transmission, the modulation method, payload size, etc. may be changed to allow transmission at a higher bit rate, but if the channel environment has become worse than that of initial transmission, then transmissions may be performed at a lower bit rate.

2) The terminal monitors the control channel (PDCCH) at each TTI, and checks the scheduling information that is received. If there is any scheduling information pertaining to the terminal, data is received from the base station through the PSCH (Physical Shared Channel) at a time related to the PDCCH.

3) The terminal receives data and stores such in a soft buffer and attempts decoding of such data. Based upon the results of such decoding, HARQ feedback is provided to the base station. Namely, the terminal sends to the base station an ACK signal if decoding is successful or a NACK signal if decoding is unsuccessful.

4) If an ACK signal is received, the base station knows that data transmission was successful and then transmits subsequent data. However, if a NACK signal is received, the base station knows that data transmission was unsuccessful and the same data is retransmitted in the same or different format at the appropriate time.

5) The terminal that sent the NACK signal, attempts reception of the data that was retransmitted. The terminal can know whether the transmitted data is an initial transmission or a retransmission of previous data by considering the NDI (New Data Indicator) in the PDCCH.

The NDI field is a one bit field that is toggled (0→1→0→1 . . . ) whenever new data is transmitted, while the same bit value is used for a retransmission. Namely, the terminal compares whether the NDI field is the same as that of the previous transmission to determine whether or not a retransmission has been performed.

6) When the terminal receives retransmitted data, decoding thereof can be attempted again by using various combinations of the data previously stored in the soft buffer after unsuccessful decoding, and an ACK signal (upon successful decoding) or a NACK signal (upon unsuccessful decoding) is sent to the base station. The terminal may repeat the procedures of sending NACK signals and receiving retransmissions until decoding is successful.

Thus far, HARQ in the downlink direction (from base station to terminal) was explained.

However, for the uplink direction (from terminal to base station), synchronous HARQ is employed. Here, synchronous HARQ refers to a technique where the time interval for each data transmission is the same. Namely, when the terminal should perform retransmission after an original transmission, such retransmission occurs at a certain time after the original transmission. As such, using the same time interval reduces any waste of radio resources that would be needed if scheduling information is transmitted using the PDCCH at various different retransmission points of time, and also results in a decrease in situations where the terminal cannot perform appropriate retransmissions because the PDCCH was not properly received.

In such synchronous HARQ procedure, values indicating the maximum number of transmissions and the maximum number of retransmissions are used.

The maximum number of transmissions is a value that is one greater than the maximum number of retransmissions (i.e. Max. # of re-Tx=Max. # of Tx+1), and both values have the same purpose. Namely, these values indicate the maximum number of times that a particular data block can be transmitted (or retransmitted) through HARQ. A maximum number of retransmissions is provided in order to minimize the delays or bottleneck in transferring data that would occur if retransmissions were unlimited, and to consider the mobile communications environment that requires sharing of radio resources among multiple users.

If the terminal receives a NACK signal from the base station with respect to its original transmission, retransmissions are performed and if the maximum number of retransmissions is reached (but still unsuccessful), further transmission of the corresponding data is stopped and such data is deleted from the buffer.

In the related art, for a terminal that is connected with a base station, a value regarding the maximum number of transmissions is received. While a connection is established, the terminal continues to use such value to perform HARQ.

However, there are two ways that the terminal receives radio resource allocation from the base station.

First, a dedicated identifier (i.e. C-RNTI) allocated to the terminal is used to receive allocation of radio resources through the PDCCH. Second, when the terminal receives allocation of radio resources through the RACH procedure (i.e. radio resources for transmitting a RACH MSG 3), radio resource allocation is received via a RACH MSG 2.

In the above first method, the base station is able to know what radio resources were allocated to which particular terminals. Thus, the base station can allocate radio resources for a time considering the maximum number of transmissions set for each terminal.

However, in the above second method, the base station cannot know what radio resources were allocated to which particular terminals. Thus, the base station cannot know what terminals use the radio resources, and cannot know the maximum number of transmission set for each terminal, and thus there are problems in not being able to allocate the necessary amount of radio resources to be used for certain time durations.

For example, if the maximum number of transmissions that was set for a terminal that actually uses a particular amount of radio resources is greater than the maximum number of transmissions expected by the base station, collisions in radio resources would occur. Also, if the maximum number of transmissions that was set for a terminal that actually uses a particular amount of radio resources is less than the maximum number of transmissions expected by the base station, the terminal does not use all of the radio resources allocated from the base station and thus a waste of radio resources occurs.

Thus, the present inventors recognized at least the above identified problems, and provided the features of the present invention to solve such problems. Namely, an aspect of the present invention is to allow the terminal to effectively use radio resources to perform retransmissions. Also, by effectively using radio resources, collisions of radio resources within a certain cell can be minimized.

Accordingly, the present invention provides a mobile terminal and a method of performing a random access procedure by the terminal that is achieved by transmitting a random access preamble to a base station, receiving a random access response from the base station, and performing an uplink transmission using an uplink grant from the base station. The uplink transmission is performed by using a maximum number of HARQ (Hybrid Automatic Repeat reQuest) transmissions parameter, which is included in a System Information Block (SIB) received from the base station.

As a result of using the present invention, the terminal can effectively use radio resources in performing retransmissions and radio resource collisions within a cell can be reduced.

The features described herein may be applied to an LTE system. However, such exemplary embodiments are not meant to be limiting, as the technical features of the present invention may be applied to various types of mobile or wireless communication systems and techniques The technical terms and phrases used herein are used to describe features in particular embodiments, and are not meant to limit the concepts of the present invention. Also, if a technical term herein is not specifically defined in a different manner, such will be interpreted to have the meaning that one of ordinary skill in the art would understand, without an excessively broad or excessively narrow interpretation. If any terms herein have been erroneously used or not completely technically accurate, then such terms may be clarified or interpreted as those skilled in the art would deem appropriate. Also, certain general terms used herein shall be interpreted according to their dictionary meaning, or interpreted in view of the context without being construed too narrowly.

Also, any words or phrases used herein in the singular may be interpreted to cover their plurality, unless clearly described to the contrary. The word "including" or "comprising" or the like should not be interpreted to mean that the various elements or steps always need to be present. Some elements or steps may not need to be present, or additional elements or steps may also be present.

The words "first" or "second" or other terms that connote an order or sequence may be used to describe various different elements or steps to provide distinguishing therebetween, unless specified that the numerical order is of some significance. For example, without exceeding the scope of the present invention, a first element can also be explained as a second element, while a second element can also be explained as a first element.

For any description about one element being "connected to" or "connected with" or the like, with respect to another element, a direct connection may be possible or an intermediate element may exist between the two elements. On the other hand, if two elements are described to be "directly" connected together, this may mean that no other elements exists therebetween.

Hereafter, with reference to the attached drawings, some embodiments will be explained, and regardless of the reference numbers in the drawings, some elements may be labeled with the same reference numbers and any repetitive explanations may have been omitted merely for the sake of brevity. Also, certain aspects of the related or conventional art, which may be a basis for the present invention, may have not been explained but could be understood by those skilled in the art. The features shown in the attached drawings are merely depicted to improve the understanding of the present invention and should not be interpreted to limit the teachings of the present invention. As such, various modifications, changes, equivalents and replacements are part of the inventive features described throughout this description.

Hereafter, the term 'mobile terminal' is used, but can also be referred to US (User Equipment), ME (Mobile Equipment), MS (Mobile Station), and the like. Also, a mobile terminal can include highly portable devices having communication functions, such as a portable phone, a PDA, a Smart Phone, a notebook/laptop computer, etc., as well as less portable devices, such as personal computers (PC), vehicle mounted devices, and the like.

Figure 7:
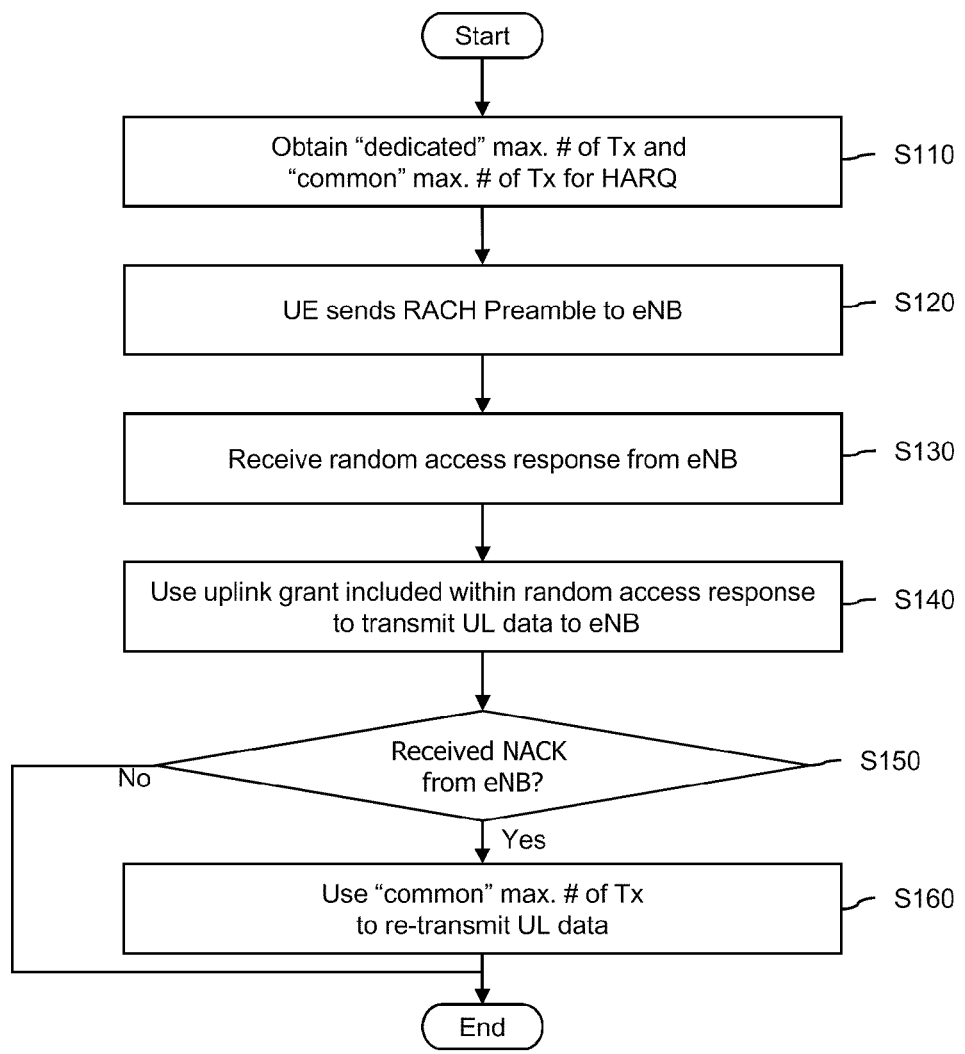
FIG. 7 shows an exemplary flow chart according to the present invention.

FIG. 7 shows an exemplary flow chart of a random access procedure for the present invention.

As shown, with respect to a single cell, the base station sets a first value for maximum number of transmissions for a HARQ that is commonly used by all terminals (namely, a common value for maximum number of transmissions), and includes such set first value into system information, which is transmitted to the terminal. Here, the common value for maximum number of transmissions can be included in the "max-HARQ-Msg3Tx" parameter. Also, the base station sets a second value for maximum number of transmissions (namely, a dedicated value for maximum number of transmissions), and includes such set second value into a dedicated message (or in a System Information Block: SIB), which is transmitted to the terminal. Here, the dedicated value for maximum number of transmissions can be included in the "max-HARQ-Tx" parameter.

Then, the terminal obtains the dedicated maximum number of transmissions and common maximum number of transmissions for HARQ (S110). Namely, the RRC layer in the terminal receives the dedicated maximum number of transmissions included in the max-HARQ-Tx parameter and the common maximum number of transmissions included in the max-HARQpMsg3Tx parameter, which are then transferred to the MAC layer.

Thereafter, in a state that dedicated radio resources have not yet been received, when there is a signaling message or user data that needs to be transmitted to the base station, the MAC layer in the terminal selects a RACH (Random Access Channel) Preamble, and transmits the selected preamble (RACH MSG 1) (S120). Here, not being allocated any dedicated radio resources means that the radio resources have not been set such that only that terminal uses such radio resources. Namely, it means that a plurality of terminals may simultaneously use the radio resources. Or, it may mean that the radio resources have not been allocated a terminal dedicated identifier (i.e. a C-RNTI). Or, it may mean that if the terminal received allocation of some radio resource, such radio resources were not set by semi-persistent scheduling (SPS).

In such case, the base station transmits control information through the PDCCH (Physical Downlink Control Channel) to the terminal to allow the terminal to appropriately receive a RACH response or a RACH MSG 2. Here, the information of the PDCCH may include information of the terminal that needs to receive the PDSCH including the RACH response or the RACH MSG 2, the frequencies of the radio resources of the PDSCH, the transmission format of the PDSCH, and the like.

If the terminal successfully receives the PDCCH, the random access response or the RACH MSG 2 transmitted through the PDSCH can be appropriately received according to the information of the PDCCH (S130). Here, the random access response may include a random access preamble identifier (ID), a UL Grant (uplink radio resources), a temporary C-RNTI (Radio Network Temporary Identifier), a Time Alignment Command (time synchronization correction value), and the like.

When the terminal receives the random access response or the RACH MSG 2, the information included in the random access response are individually processed. Namely, the Time Alignment Command is applied, and the C-RNTI is stored.

Also, the terminal uses the UL Grant to transmit the uplink data (MAC PDUs or RACH MSG 3) in the MAC layer to the base station (S140).

Thereafter, the MAC layer in the terminal checks whether a NACK signal is received from the base station (S150). If a NACK signal is received, the MAC layer in the terminal uses the common maximum number of transmissions to retransmit the uplink data (S150).

Figure 8:
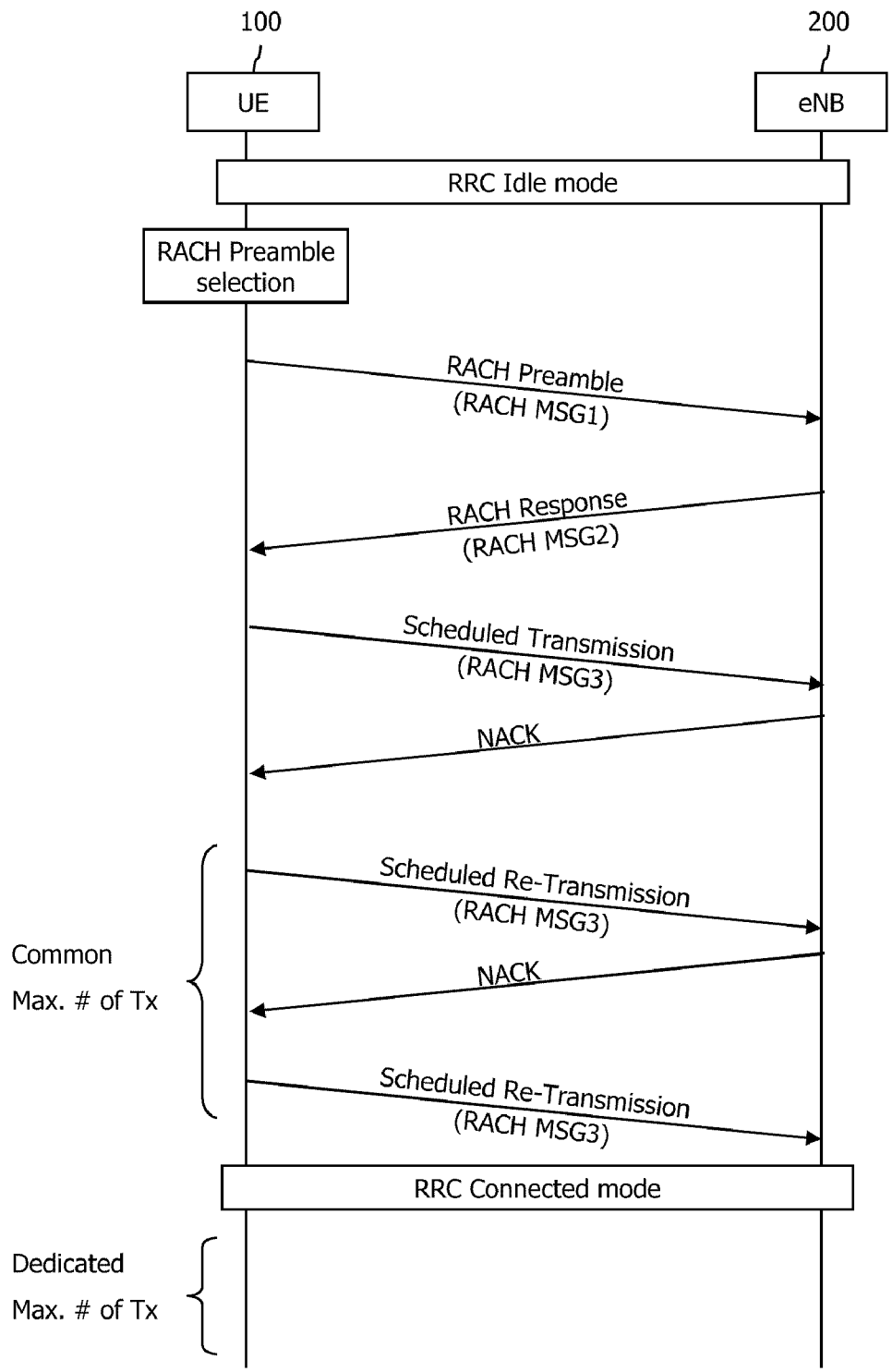
FIG. 8 shows an exemplary signal flow diagram of a contention based random access procedure between the UE and eNB.

FIG. 8 shows an exemplary flow chart of the contention based random access procedure between the terminal and the base station.

As can be understood, when the terminal 100 is in RRC Idle Mode, if data is transmitted in the uplink direction (i.e. from terminal 100 to base station eNB 200), the common value for maximum number of transmissions is used. Also, if the terminal 100 performs contention based RACH procedures, the common value for maximum number of transmission is used in order to transmit the RACH MSG 3. These steps will be described in more detail below:

1) First, if the terminal 100 is in RRC Idle Mode, a single random access preamble is randomly selected among a set of random access preambles based on an indication provided in system information or a handover command, then the PRACH resources that can be used to transmit the selected random access preamble are selected, and transmission is performed. Here, the preamble is called a RACH MSG 1. When the terminal itself selects the preamble in a random manner, such is called a contention based RACH procedure, and the selected preamble is called a contention based preamble.

2) After the terminal 100 transmits the random access preamble, reception of a random access response from the base station 200 is attempted.

In more detail, random access response information (referred to as RACH MSG 2) is transmitted in the form of a MAC PDU (Protocol Data Unit), and such MAC PDU is transferred via a PDSCH (Physical Downlink Shared Channel). Also, in order to allow the terminal 100 to appropriately receive the information transferred via the PDSCH, the base station 200 also sends control information to the terminal 100 via the PDCCH (Physical Downlink Control Channel). Namely, the information of the PDCCH may include information about the terminal that needs to receive the PDSCH, the frequency and time information about the radio resources for the PDSCH, the PDSCH transmission format, and the like.

3) If the terminal 100 succeeds in receiving the PDCCH, the random access response transmitted via the PDSCH is appropriately received according to the information of the PDSCH. Here, the random access response may include a random access preamble identifier (ID), a UL Grant (uplink radio resources), a temporary C-RNTI (Radio Network Temporary Identifier), a Time Alignment Commend (time synchronization correction value), and the like.

4) When the terminal 100 has received a valid random access response, the UL Grant is used to transmit data stored in a buffer of the terminal or newly generated data to the base station. Here, the data (i.e. MAC PDU) transmitted through the UL Grant is commonly referred to as the RACH MSG 3, and such data (MAC PDU or RACH MSG 3) includes an identifier of the terminal.

5) After the terminal 100 transmits data that includes its identifier using the UL Grant that was included in the random access response, in order to resolve any collisions, instructions from the base station 200 are awaited. Namely, the PDCCH reception is attempted in order to receive a particular message.

6) If the terminal 100 receives a NACK signal from the base station 200, the terminal 100 uses the common value for maximum number of transmissions of HARQ and retransmits the data (i.e. MAC PDU or RACH MSG 3). Such retransmission is repeated until the maximum number of transmissions is reached or until ACk is received. The common maximum number of transmissions may be received via an SIB as previously described.

7) Thereafter, when the terminal 100 enters its RRC Connected Mode, the uplink data are transmitted using the dedicated value for maximum number of transmissions.

Figure 9:
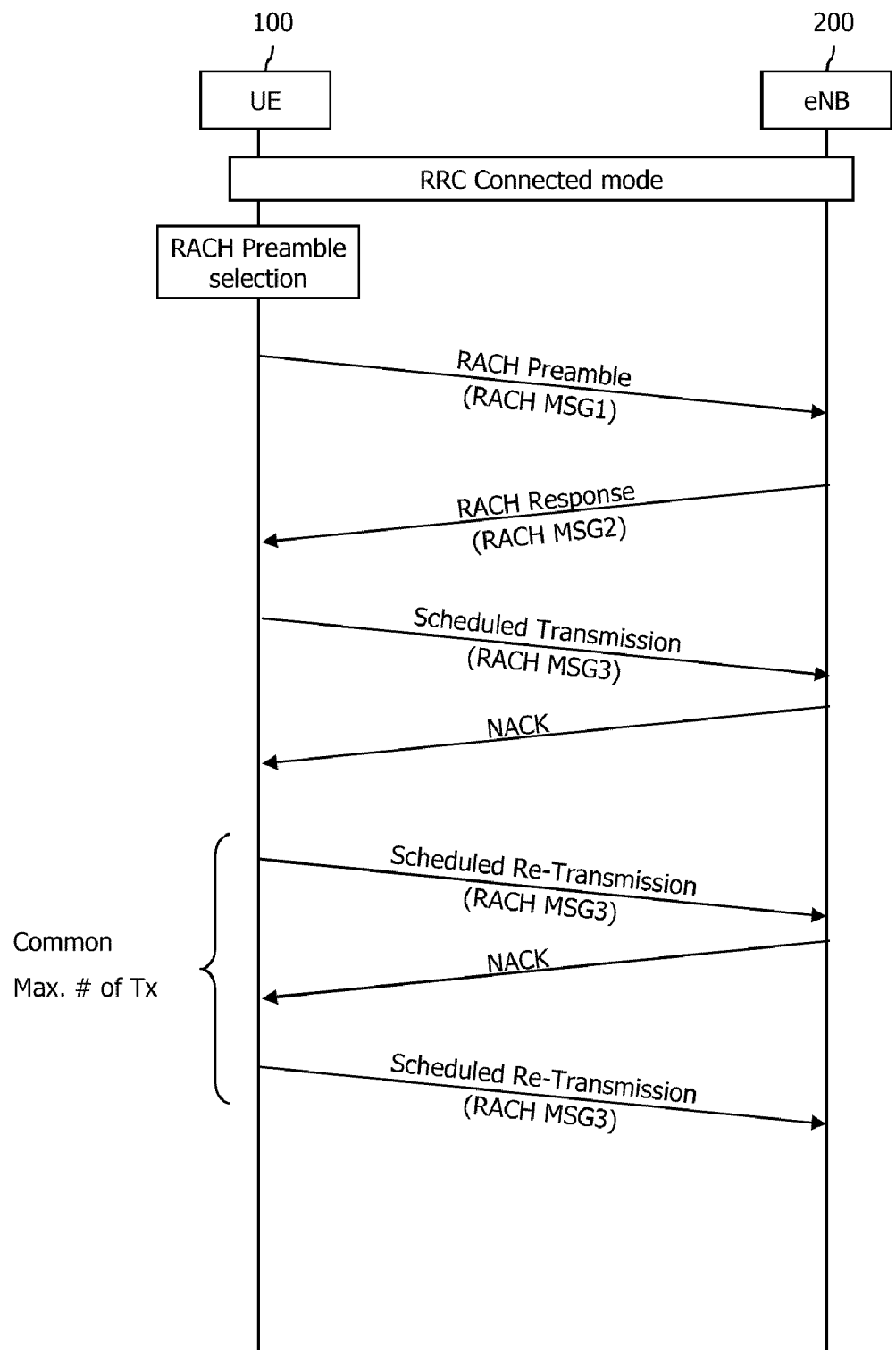
FIG. 9 shows another exemplary signal flow diagram of a contention based random access procedure between the UE and eNB.

FIG. 9 shows an exemplary flow chart of a contention based random access procedure between a terminal and base station.

As can be understood, even if the terminal 100 is in RRC Connected Mode, the common value for maximum number of transmissions is used when contention based RACH procedures are performed.

Namely, when the terminal 100 enters RRC Connected Mode, even if a dedicated value for maximum number of transmissions is received through dedicated RRC signaling, if the terminal 100 performs contention based RACH procedures, and because the base station 200 cannot know which terminal attempted transmissions, the terminal 100 uses the common value for maximum number of transmissions.

In contrast, when the terminal 100 performs non-contention based RACH procedures based upon a dedicated preamble, because the base station 200 can know which terminal attempted transmissions, the terminal 100 uses the dedicated value for maximum number of transmissions. Namely, after the terminal transmits a dedicated preamble to the base station, is a RACH MSG 2 is received, the radio resources allocated through the RACH MSS 2 are used, or later allocated radio resources are employed in order to use the dedicated value for maximum number of transmissions for HARQ when transmitted data.

The common value for maximum number of transmissions can be received from the base station via system information, and for contention based RACH procedures, the common value for maximum number of transmission can be used in transmitting the RACH MSG 3.

Meanwhile, for non-contention based RACH procedures, the dedicate value for maximum number of transmissions of HARQ for UL-SCH transmission can be used after receiving a RACH response message that includes a response for the dedicated preamble.

The exemplary embodiments of the present invention described thus far may be modified in the following manner.

To increase the efficiency of the HARQ operation, the characteristics of the RACH preamble group may be considered. With respect to the actual RACH contention based preamble, by considering the size of the message to be transmitted by the terminal and considering the amount of power that the terminal can use, two RACH preamble groups can be formed. Thus, upon such consideration in the present invention, the base station can inform the terminal of the value for maximum number of transmissions that corresponds to each RACH preamble group, and the terminal can use the value for maximum number of transmissions related to the RACH preamble group that the terminal is using in order to transmit the RACH MSG 3.

Also, when the base station used the RACH MSG 2 to allocate radio resources, the maximum number of transmissions can be set as desired. Namely, the base station can set the maximum number of transmissions to be within the limits of the radio resources allocated by the RACH MSG 2. To do so, the base station may additionally include a temporary value for maximum number of transmissions into the RACH MSG 2 that is sent to the terminal. Then, the terminal can use the temporary value for maximum number of transmissions to transmit data on the uplink.

Although the concepts about maximum number of transmissions have been described above, the maximum number of re-transmissions may be used instead.

The inventive features and characteristics described herein can be further explained in the following manner:

(1) For a UE in RRC_Connected mode, one common value is used as MAX_NUMBER_OF_ReTX for all HARQ processes/logical channels.
  This is applied to a UL-SCH resources allocated by either persistent scheduling or dynamic scheduling over PDCCH using dedicated C-RNtI.
(2) For a UE performing RACH procedure, RACH msg 3 uses UL-SCH and HARQ is applied.
  for this UL-SCH resources:
    MAX_NUMBER_OF_ReTX is informed via System information.
      this value is applied for RACH msg 3.
(3) For a UE performing RACH procedure, RACH msg 3 uses UL-SCH and HARQ is applied.
  for this UL-SCH resources:
    MAX_NUMBER_OF_ReTX for RACH is informed via System information.
    MAX_NUMBER_OF_ReTX for the UE is informed via dedicated RRC Signaling.
      if the two MAC_NUMBER_OF_ReTX is same
        the MAX_NUMBER_OF_ReTX is applied for RACH msg 3.
      if he two values are different:
        the value received via system information is applied.
        Or, the value received via dedicated RRC signaling is applied.
        Or, the smaller value of the two is applied.
        Or, the larger value of the two is applied.
        Or, the MAX_NUMBER_OF_ReTX is informed via RACH message 2. This value is applied for HARQ of RACH msg 3.
        Or, depending on the used RACH preamble Group, each RACH preamble group is assigned with a MAX_NUMBER_OF_ReTX value.
          Accordingly, the UE uses the MAX_NUMBER_OF_ReTX value associated with the used RACH preamble group transmitted at RACH MSG 1.
          MAX_NUMBER_OF_ReTX value for each RACH preamble group is indicated via system information.

The inventive features and characteristics described herein can also be further explained in the following manner:

For the HARQ operation, the terminal (or UE) may be configured with a maximum number of transmissions that is identical across all HARQ Processes and all logical channels.

In addition, the configuration of "maximum number of transmissions" is done by RRC signaling. Thus, when the base station (i.e. eNB) allocates UL-SCH resources to a specific UE, the eNB knows what the maximum number of transmission is for the allocated radio resources.

But for the case of RACH message 3 (RACH msg 3), it may not be straight-forward for the eNB to know what the maximum number of transmission is for the allocated radio resources for RACH msg 3. This is because the eNB may not know to which UE the radio resource is allocated.

As such, the following five (5) situations can be considered:

(1) Idle Mode UE

RACH can be used when a UE moves from RRC_IDLE mode to RRC_CONNECTED mode. Also, RACH can be used while the UE is in RRC_CONNECTED mode.

Until RRC connection is established, the UE is not given any dedicated configuration information. Thus, the value for "maximum number of retransmission" should be given by other means. One simple way is to use System Information (SI). Or, using a pre-defined default value can be considered.

But, regardless of whether the default value approach is used or not, the System Information (SI) approach should be adopted as a fallback mechanism for the case where default value is not appropriate.

Proposal 1: For RACH MSG 3 transmission, RRC_IDLE mode UE applies the value received via system information for the "maximum number of transmission".

(2) Contention-Based Vs. Non-Contention-Based

In case of contention-based RACH, even if a UE is in RRC Connected mode and received a value for "maximum number of transmission" via dedicated RRC signaling, the UE should not used this value for the transmission of RACH MSG 3. This is because the eNB does not know which UE is transmitting over the allocated UL-SCH until contention resolution is over.

While an eNB does not know which UE is transmitting in case of contention-based RACH, the eNB can know which UE is transmitting in case of non-contention based RACH. Thus, if a UE is allocated with a dedicated preamble, there is basically no need for the UE to use a default value.

In fact, in case of non-contention based RACH procedure, the RACH procedure can be considered as successful when a UE identifies a preamble within a RACH Response message. Then, the RACH message 3 transmission is a normal UL-SCH transmission. In this sense, for non-contention based RACH, a configured value for the UE is used for the "maximum number of transmission" value for the RACH message 3.

Proposal 2: In case of contention-based RACH, "maximum number of transmission" received over System Information is used for the transmission of RACH MSG 3. Namely, the value configured by dedicated RRC signaling is not used.

Proposal 3: In case of non-contention-based RACH, "maximum number of transmission" value configured for the UE for UL-SCH transmission is used after reception of RACH Response MSG that includes response for the used dedicated preamble.

(3) Group 1 Vs Group 2

In case of contention based RACH procedure, usable preambles are classified into two groups. The selection of group depends on radio conditions or the size of the message to be transmitted.

When eNB allocates a UL-SCH resource for RACH MSG 3, there can be various approaches. For example, the eNB may set different TB (transport block) sizes, and HARQ operation points such as "maximum number of transmission" for each group. Or to increase success rate when a UE located at a cell edge selects a preamble group which allows smaller message size, the eNB may set a bigger value for "maximum number of transmission" for the preamble group than the other group(s).

Thus, signaling support to set different values for each group should be adopted.

Proposal 4: The values for "maximum number of transmission" are separately signaled for each preamble group.

(4) Default Value for SRB1

Proposal 1: Provide default value for Maximum Number of UL transmissions to be used by the UE for SRB1.

Here, the same value of "maximum number of UL transmission" may apply to all radio bearers. If a default value for "maximum number of UL transmission" is needed, it is not for SRB1 but for all radio bearers. However, it should be clarified whether a default value exists for "maximum number of UL transmission" or not.

Proposal 5: It is proposed whether default value exist for "maximum number of transmission." If needed, it is used for all radio bearers (RBs).

(5) Dedicated Preamble Case

When an eNB allocates a dedicated RACH preamble to a UE, it also indicates the value of "maximum number of UL transmission." This value is used and can be informed via system information or via PDCCH which allocates a dedicated preamble.

When an eNB sends a RACH Response message, it can optionally include a value for "maximum number of UL transmission." This value can be included per preamble or per message. In case of per-preamble allocation, the UE which is related to the preamble should use the value for HARQ. In case of per-message allocation, the all the UE whose preamble transmission is acknowledged in the message should used the value for HARQ.

Only the first HARQ transmission, i.e, for the transmission of RACH message 3, the received value for "maximum number of transmission" is used. After that, normal value which is configured per UE or the value received SIB is used.

The features and characteristics described herein can be further explained in the following manner:

Among various MAC procedures, the Random Access procedure involves a Random Access Procedure initialization and Random Access Response reception.

The Random Access procedure can be initiated by a PDCCH order or by the MAC sublayer itself. The PDCCH order or RRC optionally indicates a Random Access Preamble and PRACH resource.

Before the procedure can be initiated, the following information is assumed to be available:

the parameter: Maximum number of Msg3 HARQ transmissions Once the Random Access Preamble is transmitted and regardless of the possible occurrence of a measurement gap, the UE shall monitor the PDCCH for Random Access Response(s) identified by the RA-RNTI defined below, in the TTI window [RA_WINDOW_BEGIN-RA_WINDOW_END] which starts at the subframe that contains the end of the preamble transmission [7] plus three subframes and has length ra-ResponseWindowSize subframes. The RA-RNTI associated with the PRACH in which the Random Access Preamble is transmitted, is computed as:

$$RA\text{-}RNTI = t\_id + 10 * f\_id$$

where t_id is the index of the first subframe of the specified PRACH ($0 \leq t\_id < 10$), and f_id is the index of the specified PRACH within that subframe, in ascending order of frequency domain ($0 \leq f\_id < 6$).

The UE may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the UE shall regardless of the possible occurrence of a measurement gap:

if the Random Access Response contains a Backoff Indicator subheader:

set the backoff parameter value in the UE as indicated by the BI field of the Backoff Indicator subheader and Table 7.2-1.

else, set the backoff parameter value in the UE to 0 ms.

if the Random Access Response contains a Random Access Preamble identifier corresponding to the transmitted Random Access Preamble (see subclause 5.1.3), the UE shall:

consider this Random Access Response reception successful;

process the received Timing Advance Command (see subclause 5.2);

indicate the amount of power ramping applied to the latest preamble transmission to lower layers (i.e., (PREAMBLE_TRANSMISSION_COUNTER-1)*POWER_RAMP_STEP);

process the received UL grant value and indicate it to the lower layers;

if the Random Access Preamble was explicitly signalled and the signalled random access preamble ID was not 000000 (i.e., not selected by MAC):

consider the Random Access procedure successfully completed.

else, if the Random Access Preamble was selected by UE MAC:

set the Temporary C-RNTI to the value received in the Random Access Response message no later than at the time of the first transmission corresponding to the UL grant provided in the Random Access Response message;

if this is the first successfully received Random Access Response within this Random Access procedure:

if the transmission is not being made for the CCCH logical channel, indicate to the Multiplexing and assembly entity to include a C-RNTI MAC control element in the subsequent uplink transmission;

obtain the MAC PDU to transmit from the "Multiplexing and assembly" entity and store it in the Msg3 buffer.

It should be noted that when an uplink transmission is required, e.g., for contention resolution, the eNB should not provide a grant smaller than 80 bits in the Random Access Response.

Also, it should be noted that if within a Random Access procedure, an uplink grant provided in the Random Access Response for the same group of Random Access Preambles has a different size than the first uplink grant allocated during that Random Access procedure, the UE behavior is not defined.

Regarding the HARQ process, each HARQ process is associated with a HARQ buffer. Each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4.

New transmissions and adaptive retransmissions are performed on the resource and with the MCS indicated on PDCCH, except for new transmissions of Msg3 which are performed according to UL grant in Random Access Response. Non-adaptive retransmission is performed on the same resource and with the same MCS as was used for the last made transmission attempt, The UE is configured with a Maximum number of HARQ transmissions and a Maximum number of Msg3 HARQ transmissions by RRC. For transmissions on all HARQ processes and all logical channels except for transmission of a MAC PDU stored in the Msg3 buffer, maximum number of transmissions shall be set to Maximum number of HARQ transmissions. For transmission of a MAC PDU stored in the Msg3 buffer, maximum number of transmissions shall be set to Maximum number of Msg3 HARQ transmissions.

Regarding MAC-Main Configuration field descriptions, a "maxHARQ-Tx" may have a parameter: max-HARQ-Tx. If such is absent in the RRCConnectionSetup message, a predefined default value may be used.

Regarding RACH-ConfigCommon field descriptions, a "maxHARQ-Msg3Tx" may have a parameter: max-HARQ-Msg3-Tx. Such can be used for contention based random access, and this value is an integer.

The present invention provides a method of performing a random access procedure by a terminal. Such method may be performed for an LTE system, a UMTS system, or the like. The steps of transmitting a random access preamble to a base station, receiving a random access response from the base station, and performing an uplink transmission using an uplink grant from the base station, are performed, wherein the uplink transmission is performed by using a maximum number of HARQ (Hybrid Automatic Repeat reQuest) transmissions parameter, which is included in a System Information Block (SIB) received from the base station.

Here, the uplink grant may be included in the received random access response. The random access preamble may have been selected at a MAC (Medium Access Control) layer in the terminal. The uplink transmission may include a mobile terminal identifier and the uplink grant is related to HARQ information. The uplink grant and the HARQ information may be received from a lower layer with respect to the MAC layer. The random access response may trigger a generation of a message that is temporarily stored and wherein the maximum number of HARQ transmissions parameter is used in deciding when to flush a HARQ buffer in the terminal.

The present invention also provides a terminal comprising an RRC (Radio Resource Control) layer configured to receive maximum number of HARQ (Hybrid Automatic Repeat reQuest) transmissions parameters via system information or via a dedicated massage, and a MAC (Medium Access Control) layer configured to receive two kinds of maximum number of HARQ transmissions parameters from the RRC layer, wherein a first kind of maximum number of HARQ transmissions parameter is used for transmission of data related to a RACH procedure, and a second kind of maximum number of HARQ transmissions parameter is used for other types of transmissions.

Here, the transmission of data related to the RACH procedure may use a RACH MSG3 message. The first kind of maximum number of HARQ transmissions parameter is received via the system information, and the second kind of maximum number of HARQ transmission parameter is received via the dedicated message. The transmission of data related to the RACH procedure is defined as an uplink transmission using an uplink grant received in a RACH access response. The RACH access response triggers a generation of a message, which is temporarily stored. Here, a MSG 3 may be stored in a so-called MSG3 buffer. The maximum number of HARQ transmissions parameter is used in deciding when to flush a HARQ buffer in the terminal. A Maximum number of HARQ transmissions and a Maximum number of Msg3 HARQ transmissions are configured by the RRC layer. For transmissions on all HARQ processes and all logical channels except for transmission of a MAC PDU stored in a Msg3 buffer, a maximum number of transmissions shall be set to Maximum number of HARQ transmissions. For transmission of a MAC PDU stored in a Msg3 buffer, a maximum number of transmissions shall be set to Maximum number of Msg3 HARQ transmissions.

The features described herein can be applied to the so-called LTE (Long Term Evolution) technologies, which are being developed after 3G mobile communications in anticipation of rapidly increasing data traffic. Such is one aspect of developing an evolved network that can support greater bandwidth, and the term E-UTRAN (Evolved UTRAN) is being used.

However, the features and characteristics described herein are not meant to be limited to LTE, but can also be adapted, applied and implemented in various other communication systems and methods, such as GSM, GPRS, CDMA, CDMA2000, WCDMA, IEEE 802.xx, UMTS, etc.

The method of the present invention explained thus far can be implemented in software, hardware, or a combination thereof. For example, the method of the present invention can be implemented as codes or commands of a software program that can be executed by a processor (CPU), and can be saved in a storage medium (e.g. memory, hard disk, etc.).

Certain aspects for the method of the present invention may be implemented in a mobile terminal or network entity (such as the RNC or Node B of FIG. 1). The mobile terminal or network entity may include the protocols of FIGS. 2 and 3, as can be understood by those skilled in the art.

Thus far, some exemplary embodiments of the present invention have been described, but such embodiments are not meant to limit the features described herein. As such, all reasonable and various modifications, changes, improvement and variations are part of the present invention.

INDUSTRIAL APPLICABILITY

The features and concepts herein are applicable to and can be implemented in various types of user devices (e.g., mobile terminals, handsets, wireless communication devices, etc.) and/or network entities that can be configured to support a method for performing random access procedures.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of performing a random access procedure by a terminal, the method comprising:
   setting two kinds of maximum number of Hybrid Automatic Repeat reQuest (HARQ) transmissions parameter, wherein a first kind of maximum number of HARQ transmissions parameter is used for transmitting an uplink data according to Random Access Channel (RACH) procedure and a second kind of maximum number of HARQ transmissions parameter is used for transmitting data other than Protocol Data Unit (MAC PDU) stored in a MSG3 buffer;
   transmitting a random access preamble which is selected at a Medium Access Control (MAC) layer in the terminal;
   receiving a random access response in response to transmitting the random access preamble; and
   performing an uplink transmission using an uplink grant included in the random access response,
   wherein the uplink data includes an identifier of the terminal and the uplink data transmitted using the uplink grant is a MAC PDU, and
   wherein the uplink transmission is performed by using the first kind of maximum number of HARQ transmissions parameter, which is included in a System Information Block (SIB) received from a base station.

2. The method of claim 1, wherein the uplink grant is received from a lower layer and information on the first kind of the maximum number of HARQ transmissions parameter is received from the lower layer.

3. The method of claim 1, wherein the uplink data is RACH MSG3.

4. The method of claim 1, wherein the random access response triggers generation of RACH MSG3 related to the uplink data.

5. The method of claim 4, wherein the triggered RACH MSG3 is temporally stored within the MSG3 buffer.

6. The method of claim 1, wherein the first type of the maximum number of HARQ transmissions parameter is a max-HARQ-Msg3Tx parameter.

7. A terminal comprising:
   A Radio Resource Control (RRC)) layer configured to receive two kinds of maximum number of Hybrid Automatic Repeat reQuest (HARQ) transmissions parameters via system information or via a dedicated massage; and
   a Medium Access Control (MAC) layer configured to receive the two kinds of maximum number of HARQ transmissions parameters from the RRC layer,
   wherein a first kind of maximum number of HARQ transmissions parameter is used for transmission of data related to a RACH procedure, and a second kind of maximum number of HARQ transmissions parameter is used for transmission of data other than Protocol Data Unit (MAC PDU) stored in a MSG3 buffer.

8. The terminal of claim 7, wherein the transmission of data related to the RACH procedure uses a RACH MSG3 message.

9. The terminal of claim 7, wherein the first kind of maximum number of HARQ transmissions parameter is received via the system information, and the second kind of maximum number of HARQ transmission parameter is received via the dedicated message.

10. The terminal of claim 7, wherein the transmission of data related to the RACH procedure is defined as an uplink transmission using an uplink grant received in a RACH access response.

11. The terminal of claim 10, wherein the RACH access response triggers generation of RACH MSG3, which is temporarily stored.

12. The terminal of claim 11, wherein the triggered RACH MSG3 is temporally stored in the MSG3 buffer.

13. The terminal of claim 7, wherein the maximum number of HARQ transmissions parameter is used for determining when to flush a HARQ buffer in the terminal.

14. The terminal claim 7, wherein the first type of the maximum number of HARQ transmissions parameter is a max-HARQ-Msg3Tx parameter.

15. The terminal claim 7, wherein the second type of the maximum number of HARQ transmissions parameter is max-HARQ-TX.

* * * * *